Dec. 17, 1963
F. KOURY
3,114,854
INDICIA BEARING DEVICE
Filed Sept. 6, 1960
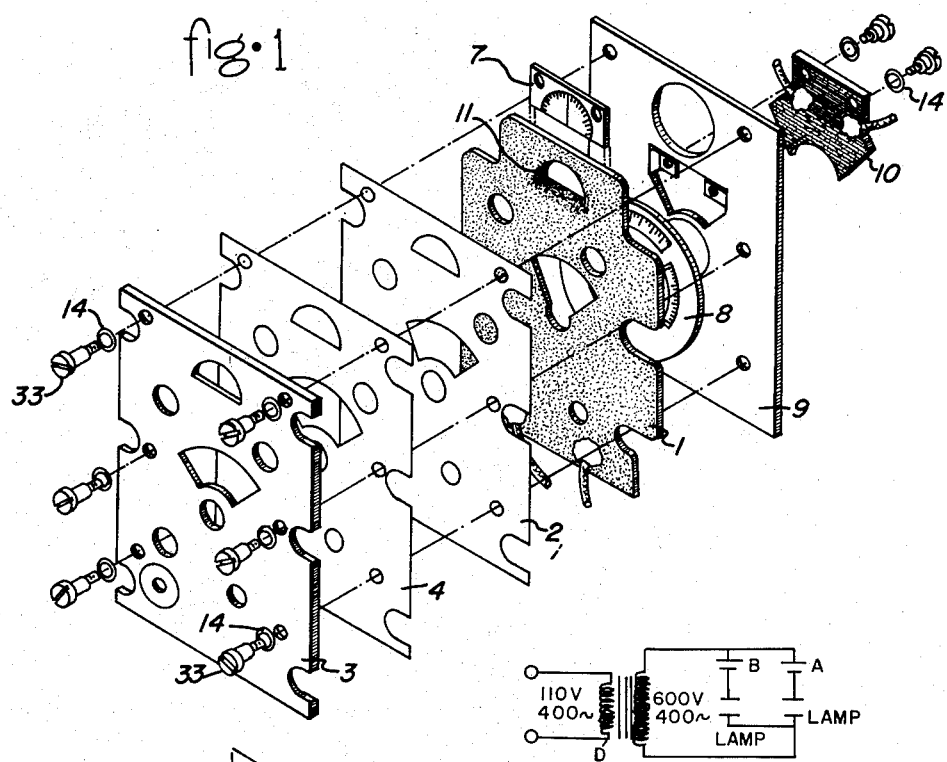
fig. 1
fig. 3
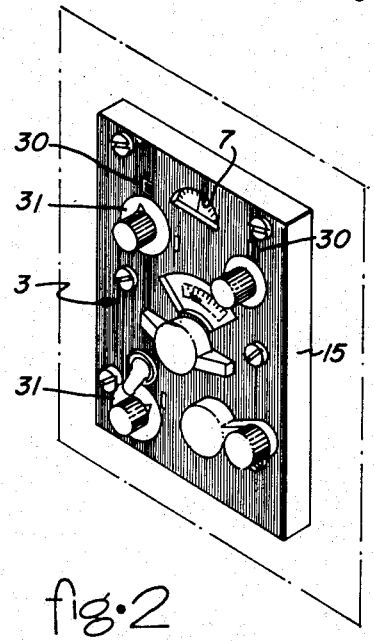
fig. 2
FREDERIC KOURY
INVENTOR.
BY
ATTORNEY

United States Patent Office 3,114,854
Patented Dec. 17, 1963

3,114,854
INDICIA BEARING DEVICE
Frederic Koury, Lexington, Mass., assignor to Sylvania Electric Products Inc., a corporation of Delaware
Filed Sept. 6, 1960, Ser. No. 54,203
6 Claims. (Cl. 313—108)

This invention relates to illuminated instrument control assemblies. More specifically, this invention relates to aircraft control assemblies illuminated by electroluminescence. Further, this invention relates to a means for illuminating aircraft control assemblies with electroluminescent lamps in a desired color irrespective of the emission color of the electroluminescent phosphor.

In the past, instrument control assemblies have been illuminated by six or eight incandescent lamps. These types of aircraft control assemblies have necessitated enlargement and a great number of electrical leads. Furthermore, they have entailed a number of other difficulties; for example, when operating with six or eight lamps, the probability of lamp failure is extremely high. Through the use of electroluminescent lamps which have extremely long life and are fabricated in the shape of a structurally stable plate, the instrument control is materially improved. The assembly is more easily fabricated since a large number of the components which were previously thought to be essential are eliminated. Through the use of these electroluminescent lamps a 5 to 10% reduction in weight is obtained.

It is essential in many types of aircraft instrument assemblies that only red lights show through the observable face. A showing of any other color, for example green (which is the emission color of commercial electroluminescent lamps) is not acceptable. In order to obviate the problem of the emission of other colors, a second layer of phosphor pigment is disposed over the electroluminescent lamp. Furthermore, precautions must be taken against the difference in the coefficient of expansion of the various elements and also against their warpage. In a fairly compact unit, if the electroluminescent lamp becomes warped or expands to an undesirable extent, light of an unwanted color may be transmitted to the face of the instrument control.

It is an object of this invention to provide for an instrument control assembly illuminated by electroluminescent lamps.

Another object of this invention is to provide for an aircraft instrument assembly illuminated by electroluminescence which is rugged and dependable in service.

It is an advantage of this aircraft instrument control assembly that the requisite red color for illumination of the various dials may be obtained through the use of a minimum of relatively inexpensive electroluminescent lamps.

Another advantage of this type of electroluminescent illumination is that the non-filamentary construction is substantially more rugged than incandescent or fluorescent lamp illumination, thus making it more suitable for use in aircraft instrument control panels.

Another advantage of this invention is than an illuminated aircraft instrument assembly can be prepared of only a few relatively simple flat plates, thus eliminating the intricate wiring and complicated circuitry of the devices illuminated by incandescent lamps such as described in the prior art.

Other objects, features and advantages of this invention will become apparent to those skilled in the art upon reading the following specification and the accompanying drawing.

Referring now to the drawing, FIGURE 1 is an exploded view of an aircraft assembly illuminated by electroluminescent lamps and fabricated according to this invention.

FIGURE 2 is a perspective view of an assembled aircraft instrument control panel fabricated according to this invention.

FIGURE 3 is a view illustrating the circuitry necessary to illuminate two electroluminescent lamps so that each may show equal illumination to an observer.

Referring now to FIGURE 1 of the drawing, the electroluminescent lamp 1 is the chief source of illumination of the instrument control assembly face 3. It may be prepared in the usual manner for metal-backed ceramic lamps. For example, such fabrication is shown in the patent to Payne entitled "Electroluminescent Lamp," No. 2,838,715.

An electroluminescent device generally has a first electrode, a second electrode and a layer of light-producing material including an electroluminescent phosphor between the first and the second electrodes. In practice one of these electrodes serves as a backing plate and is usually prepared of a structurally stable material which will impart stability and rigidity to the lamp, for example it may be prepared from steel. Generally the metal plate is used, however, other materials such as glass, which is adapted to conduct electricity, may be substituted for the metal.

The other electrode of the lamp can be a light-transmitting material. Generally when using an inorganic light-producing layer, the other electrode is a transparent film of tin oxide. It may be deposited, for example, by brushing or spraying the lamp with a solution of tin chloride and a suitable organic carrier, for example formaldehyde. Although this is the preferred embodiment of the second electrode, it may be, for example, another piece of conductive glass.

The light-producing material between each of the aforesaid electrodes must contain an electroluminescent phosphor, for example activated zinc sulfide which can be embedded in a solid dielectric material, for example a glass or plastic.

The entire assembly mentioned above generally is coated with a layer of light-transmitting fused glass. This layer of glass inhibits the attack of humidity and chemicals present in the atmosphere which would tend to attack the electroluminescent phosphor in the lamp and gradually degrade and eventually extinguish the lamp. Although the use of this layer of glass is preferred in the construction of the lamp, it may be omitted if conditions allow or if another suitable barrier layer is used. For example, it has been found that an epoxy resin may be coated over the surface of the light-transmitting electrode.

The layer of light-producing material including the electroluminescent phosphor between the first and second electrodes is embedded in a fusible glass, such as shown in the co-pending application of Richard M. Rulon, Ser. No. 365,617, filed July 2, 1953. The electroluminescent phosphor can be, for example, copper-activated zinc sulfide such as shown in the Goldberg et al. application entitled "Electroluminescent Device," Serial No. 714,481, filed February 11, 1958.

In all of the electroluminescent devices now commercially available the color of the light emission is a green. In order to compensate for the green emission of the lamp, suitable color compensation means are interposed between the lamp and the light-transmitting face of the assembly. If it is desired, however, to illuminate the instrument assembly control face in the emission color of the phosphor, these color compensation means may be omitted.

Two plastic overlays 2 and 4 are positioned between the lamp and the assembly face. The first overlay 2 comprises a correctional fluorescent phosphor pigment (as shown in U.S. Patent 2,448,592) embedded in a vinyl and is capable of emitting light when excited by radiation from the electroluminescent phosphor, the light emitted from this second phosphor being in a different spectral region than that of the electroluminescent phosphor. This overlay 2 will convert the green light emitted from the lamp to a red emission. Although it is shown in the drawing as a separate element from the lamp 1, it is also possible to coat the plastic directly onto the lamp, thereby producing a unitary bonded surface. Since the entire spectral region of red light emitted from the phosphor layer 2 is not desired, a red filter 4 is placed between it and the face plate 3. Although the layer also is shown in the drawing to be a separate element from either the correctional phosphor layer 2 or the electroluminescent lamp 1, it is possible to coat this red filter onto the electroluminescent device also. Thus any light which will be emitted from the device will have exactly the wave length required for use.

It is to be noted, however, that not only may red filters and red correctional phosphors be used in the practice of this invention, but also if it is desired to produce light of different wave lengths, other filters and correctional phosphors may be disposed upon the lamp.

A light-transmitting face 3 serves as the observable instrument control face of the assembly. This light-transmitting face may be, for example, clear Lucite coated with white legends indicating the desired characters and figures for the various dials. The remainder of the Lucite panel is blacked out, that is, means rendering opaque portions of the panel are used to inhibit the passage of light through the face. Thus, when the light is transmitted through the correctional phosphor and the filter, it will pass through the white portions but will be eliminated in the blacked out portions. Through the use of the white legend on the blacked background, a sharp delineation is made in the transmitted light. Each of the various characters and figures will clearly show up to the observer not only in the dark, but also in the light. This principle is more clearly shown on FIGURE 3 of the drawing. As is seen, for example, each of characters 30 and figures 31 will transmit light, the remainder of the plate will be dark.

The remainder of the aircraft control assembly comprises a dial 7, a dial 8, a backing surface 9 and a second electroluminescent lamp 10. Through the use of the upwardly tapered portion 11 on the electroluminescent lamp 1, light is reflected rearwardly toward the dial 7 which merely is a reflective surface and need not be light-transmitting as is plate 3. The use of this tapered portion 11 eliminates the need for any separate illumination for this dial. The dial 8 also is a light-transmitting Lucite surface similar in nature to the face 3 of the assembly. It, too, has white lettering on a black background. It is to be noted that through the use of the light-transmitting material in this dial, no wiring need be affixed thereto. This is quite important since this dial must be free to rotate 360°. The second electroluminescent device 10 is affixed to the rear of the backing plate 9. Light will be transmitted through the aperture in the backing plate and to the surface of the dial. An aperture is provided in each of the surfaces 3, 4, 2 and 1 respectively so that light may be transmitted through the assembly to the observer. The second electroluminescent lamp 10 is covered with the correctional phosphor and filter in a similar manner as the electroluminescent lamp 1, although not shown herein as separate elements. Although not shown in this illustration, the lamp may be equipped with separate layers as shown in elements 12 and 13 or may be coated on the device.

When using two electroluminescent devices with one positioned behind the other, the rear electroluminescent device will not appear to the observer to be as bright as the forward one. This is because the brightness will diminish proportionately to the inverse square of the distance to the observer. Since the second electroluminescent device is further from the Lucite plate 3 than is the electroluminescent lamp 1, compensation must be introduced into the system since without it, illumination on the Lucite plate 3 would be greater than the illumination on the rotating dial 8. Such compensation is obtained by using circuitry such as shown in FIGURE 3. Transformer 12 receives 110 v., 400 cycles in the primary winding and steps up the voltage to 600 v., 400 cycles. The capacitors B and A focus a voltage divider with values chosen so as to have a voltage drop across the lamp thus yielding equal brightness in each lamp to the observer. Furthermore, this capacitor serves as a current limiting device.

As previously noted, it is essential that only red light is transmitted to any of the lettering or dials in an aircraft instrument control plate. Since in use, the coefficient of expansion of the various elements may be different and the heat to which the instrument control assembly is subjected may be varied, the various elements will contract or expand to a different degree. In order to inhibit the shifting of the various elements, Teflon grommets (illustratively shown as element 14 in FIGURE 2) are inserted around each of the screws 33 in the instrument control assembly. Thus even though any of the elements may expand or contract, they will be rigidly affixed in place while the equipment is assembled.

As is shown in FIGURE 2 of the drawing, the completed assembly of the aircraft instrument control panel may be mounted in the rubber gasket 15. This rubber gasket will inhibit the passage of substances detrimental to the control panel, for example, salt spray. The first electroluminescent lamp will illuminate transparent portions forming the lettering on the face of the assembly 3. This electroluminescent lamp illuminates the dial 7, although it is recessed from the lamp assembly face as described previously. The second electroluminescent lamp illuminates the dial 8. This dial is rotated by each of controls 17 and 18.

It is apparent that changes and modifications may be made in this invention. For example, the illuminated control assembly is not limited in its application only to aircrafts, but also has many other uses such as clock faces or any other instrument where sharp delineation of light and "in dark" observation is desired. It is my intent, however, to be limited only by the scope of the appended claims.

As my invention I claim:

1. An illuminated instrument control assembly comprising, an electroluminescent lamp having an activated electroluminescent phosphor between two electrodes at least one of said electrodes being light transmitting, a layer of phosphor over said light-transmitting electrode capable of emitting light when excited by radiation from said electroluminescent phosphor, the light emitted from said second phosphor being in a different spectral region from that of said electroluminescent phosphor, a transparent control panel over said second layer of phosphor, means disposed over the face of said panel rendering portions thereof opaque, thereby inhibiting the passage of light and delineating characters and figures.

2. The control assembly according to claim 1 wherein a filter layer is disposed over the second phosphor layer, said filter layer being adapted to remove a part of the spectral emission of said phosphor.

3. An illuminated instrument control assembly comprising, an electroluminescent lamp having an activated electroluminescent phosphor between two electrodes at least one of said electrodes being light transmitting, a second layer of phosphor over said light-transmitting electrode a transparent control panel over said second layer of phosphor, means disposed over the face of said panel rendering portions thereof opaque, thereby inhibiting the passage of light and delineating characters and figures.

4. The control assembly according to claim 3 wherein a filter layer is disposed over the second phosphor layer, said filter layer being adapted to remove a part of the spectral emission of said second phosphor.

5. An illuminated control assembly comprising, an electroluminescent lamp having a structurally stable backing surface forming the first electrode and rear of said lamp, a layer of light emitting material including an electroluminescent phosphor over the first electrode, means forming a second electrode over said layer of electroluminescent phosphor, at least said second electrode being light transmitting, means forming an aperture in said electroluminescent lamp, at least a portion of the periphery of said aperture being tapered toward the rear of said lamp, whereby light will be transmitted rearwardly, a layer of phosphor over said light-transmitting electrode capable of emitting light when excited by radiation from said electroluminescent phosphor, the light emitted from said second phosphor being in a different spectral region from that of said electroluminescent phosphor, a dial behind said aperture illuminated by the rearwardly transmitted light, a transparent instrument control panel over said second layer of phosphor, means disposed over the face of said panel rendering portions thereof opaque, thereby inhibiting the passage of light and delineating desired characters and figures.

6. An illuminated aircraft instrument control assembly comprising a first electroluminescent lamp having first structurally stable electrode, a second light transmitting electrode, a layer of light transmitting material including an activated electroluminescent phosphor between said first and second electrodes, a layer of phosphor over said light transmitting electrode capable of emitting light when activated by radiation from said electroluminescent phosphor, the light emitted from this phosphor being a different spectral region from that of said electroluminescent phosphor, means forming an aperture in said electroluminescent lamp, a transparent instrument control panel over said second layer of phosphor, means rendering opaque portions of said panel thereby inhibiting the passage of light and delineating desired characters and figures, a light transmitting dial behind the aperture in said electroluminescent lamp, means disposed over the face of said dial rendering portions thereof opaque and thereby delineating desired characters and figures, a second electroluminescent lamp behind said dial having a layer of phosphor between two electrodes, at least the electrode nearest the dial being light transmitting, a layer of phosphor over the light transmitting electrode capable of emitting light when exerted by radiation from said electroluminescent phosphor, the light emitted from said phosphor being in a different spectral region from that of said electroluminescent phosphor whereby the light will be transmitted from said phosphor through the dial for observation.

References Cited in the file of this patent

UNITED STATES PATENTS

| | | |
|---|---|---|
| 2,790,161 | Joorman | Apr. 23, 1957 |
| 2,820,918 | Aronstein | Jan. 21, 1958 |
| 2,908,806 | Cohen | Oct. 13, 1959 |
| 2,924,732 | Lehmann | Feb. 9, 1960 |